United States Patent [19]

Stein et al.

[11] Patent Number: 5,497,630
[45] Date of Patent: Mar. 12, 1996

[54] METHOD AND APPARATUS FOR HYDRIDE HEAT PUMPS

[75] Inventors: Charles Stein; Edward M. Redding, both of Albuquerque, N.M.

[73] Assignee: Thermal Electric Devices, Inc., Albuquerque, N.M.

[21] Appl. No.: 955,305

[22] Filed: Sep. 30, 1992

(Under 37 CFR 1.47)

[51] Int. Cl.⁶ ........................................ F25B 17/08
[52] U.S. Cl. ......................... 62/112; 62/480; 165/104.12
[58] Field of Search ..................... 165/104.12; 62/480, 62/112

[56] References Cited

U.S. PATENT DOCUMENTS

| | | | |
|---|---|---|---|
| 4,040,410 | 8/1977 | Libowitz | 126/270 |
| 4,055,962 | 11/1977 | Terry | 62/102 |
| 4,413,670 | 11/1983 | Ritter | 165/104.12 |
| 4,784,217 | 11/1988 | Payre et al. | 165/104.12 |

FOREIGN PATENT DOCUMENTS

| | | | |
|---|---|---|---|
| 226674 | 11/1985 | Japan | 165/104.12 |

OTHER PUBLICATIONS

G. Anevi, et al., "Dynamics of Hydride Heat Pumps," *Journal of the Less–Common Metals,* vol. 104, pp. 341–348 (1984).
O. Bernauer, et al., "Properties of Metal Hydrides for Use in Industrial Applications," *Journal of the Less–Common Metals,* vol. 131, pp. 213–224 (1987).
H. Bjurstrom, et al., "The Dynamics of Hydrogen Transfer in a Metal Hydride Heat Pump," *Journal of the Less–Common Metals,* vol. 131, pp. 225–234 (1987).
J. L. Briesacher, et al., "Low Temperature Non–Evaporable Getters for Gas Purification," *HWT Laboratory Hydride Storage Units,* Ergenics, Inc. commercial catalog, pp. 1–13 (post 1987).
P. Dantzer, "Static, Dynamic and Cycling Studies on Hydrogen in the Intermetallics $LaNi_5$ and $LaNi_{4.77}Al_{0.22}$," *Journal of the Less–Common Metals,* vol. 131, pp. 349–363 (1987).
D. M. Gruen, et al., "Stability Considerations of $AB_5$ Hydrides in Chemical Heat Pump Applications with Reference to the New $LaNi_{5-x}Al_x$ Ternary System," *Transition Metal Hydrides,* Advances in Chemistry Series 167, American Chemical Society, Washington, D.C. (1978).
P. V. Hale, et al., "Phase Change Materials Handbook," *NASA Report: NASA–CR–613–63,* p. 1 (1971).
E. L. Huston, et al., "Engineering Properties of Metal Hydrides," *Journal of the Less–Common Metals,* vol. 74, pp. 435–443 (1980).
J. A. Jones, "Regenerative Hydride Heat Pump," *NASA Tech Briefs,* vol. 16, No. 2, NPO–18104, pp. 90–91 (Feb. 1992).
G. G. Libowitz, et al., "Use of Vanadium–Based Solid Solution Alloys in Metal Hydride Heat Pumps," *Journal of the Less–Common Metals,* vol. 131, pp. 275–282 (1987).
M. Nagal, et al., "Operating Characteristics of a Metal Hydride Heat Pump for Generating Cooled Air," *Journal of the Less–Common Metals,* vol. 104, pp. 307–318 (1984).
T. Nishizaki, et al., "Coefficients of Performance of Hydride Heat Pumps," *Journal of the Less–Common Metals,* Journal of the Less–Common Metals, vol. 89, pp. 559–566 (1983).

(List continued on next page.)

*Primary Examiner*—John K. Ford
*Attorney, Agent, or Firm*—Deborah A. Peacock; Jeffrey D. Myers; Dennis F. Armijo

[57] ABSTRACT

The disclosure is directed to an apparatus and method to increase the coefficient of performance (COP) of hydride heat pump systems to compete with the performance of conventional vapor compression and absorption refrigeration systems. The disclosure is particularly directed to hydrides with van't Hoff curves that cross, whereby the regeneration of the refrigerant hydride occurs at a temperature above the crossing, thereby allowing for a major fraction of the energy required for the regeneration to be supplied by the heat of absorption of the refrigerant. Additionally, the COP can be increased by selection of hydrides, and the kinetics of the system can be improved by the use of heat pipes and phase change materials.

17 Claims, 8 Drawing Sheets

OTHER PUBLICATIONS

E. Orgaz, et al., "Thermodynamics of the Hydride Chemical Heat Pump: III Considerations for Multistage Operation," *Journal of the Less–Common Metals*, vol. 131, pp. 385–398 (1987).

M. Ron, "A Hydrogen Heat Pump as a Bus Air Conditioner," *Journal of the Less–Common Metals*, vol. 104, pp. 259–278 (1984).

I. Sheft, et al., "Current Status and Performance of the Argonne Hycosos Chemical Heat Pump System," *Journal of the Less–Common Metals*, vol. 74, pp. 401–409 (1980).

S. Suda, "Experimental Evaluation of Heat Pump Performance in Connection with Metal Hydride Properties," *Journal of the Less–Common Metals*, vol. 104, pp. 211–222 (1984).

W. Supper, et al., "Reaction Kinetics in Metal Hydride Reaction Beds with Improved Heat and Mass Transfer," *Journal of the Less–Common Metals*, vol. 104, pp. 279–286 (1984).

H. H. van Mal, "A $LaNi_5$–Hydride Thermal Absorption Compressor for a Hydrogen Refrigerator," *Chemie–Ing. –Techn.* 45. Jahrg. 1973/Nr.2 (No date).

E. Veleckis, et al., "The Lithium–Lithium Hydride System," *The Journal of Physical Chemistry*, vol. 78, No. 19, pp. 1933–1940 (1974).

"HWT Laboratory Hydride Storage Units," Series HWT–KL 114, brochure distributed by SAES GETTERS/U.S.A., Inc. (No date).

SCHEMATIC DRAWING OF EXPERIMENTAL
HYDRIDE REFRIGERATION SYSTEM

1

METHOD AND APPARATUS FOR HYDRIDE HEAT PUMPS

BACKGROUND OF THE INVENTION

1. Field of the Invention (Technical Field)

The invention relates to an improved hydrogen-driven hydride heat pump refrigeration and heating apparatus and more particularly to a method and apparatus for improvement of the coefficient of performance of hydride driven heat pump refrigeration and heating systems.

2. Background Art

The use of chloro-fluoro-carbon refrigerants (CFCs) is a significant source of pollution to the global environment, a problem the United States and other countries are endeavoring to minimize through promotion of alternative refrigeration and air conditioning systems. One of the most promising alternatives is the use of hydrogen in the form of hydrides as the refrigerant. While this idea has been studied for a number of years, hydride driven heat pump refrigerators have thus far been unable to perform at levels competitive with conventional freon refrigeration systems.

The hydride heat pump for refrigeration was invented by L. E. Terry (U.S. Pat. No. 4,055,962, November 1977). While development of this system continues, a system which can successfully compete with the performance of conventional refrigeration systems has not, to date, emerged. Consequently, the goal of limiting one of the primary uses of CFCs by the alternate use of hydride refrigeration systems had not been realized.

In hydride heat pump systems currently in use, a low temperature metal hydride (the refrigerant hydride) is coupled to a high temperature hydride (the regenerator hydride) permitting energy to be extracted from the refrigerated space. The energy absorbed at low temperature during the refrigeration step disassociates hydrogen from the refrigerant hydride where it flows into the regenerator hydride, which is at a lower pressure. An important advantage of this system is that these heat pumps operate without moving parts, using hydrogen as the working fluid in a closed cycle which can be repeated indefinitely. This technique is described by D. M. Gruen, M. H. Mendleson, and A. E. Dwight, in "Transition Metal Hydrides," *Advances in Chemistry Series* #167, American Chemical Society, p. 331 (1978).

In *The Journal of the Less Common Metals*, Vol. 104, p.307 (1984), M. Nagel, Y. Komazaki, and M. Uchida teach conventional refrigerator configurations based on two metal hydrides, in which energy $Q_1$ is absorbed by the refrigerant hydride at the refrigerator's low temperature range and the desorbed hydrogen is transferred to the regenerator hydride. See points 10 and 12 in FIG. 1 (prior art) in which the log of the pressure is plotted as a function of the reciprocal of the absolute temperature. The curves in FIG. 1 are van't Hoff curves where the slope represents the enthalpy, $\Delta H$, for absorption and desorption of hydrogen from the hydrides. Following its charging with hydrogen, the regenerator hydride (e.g., $LaNi_{4.65}Al_{0.3}$) is then heated to 150° C. (point 14 of FIG. 1), where heat $Q_3$ is supplied from external sources to decompose this hydride and cause hydrogen to charge the refrigerant hydride (e.g., $MmNi_{4.0}Fe_1$ where Mm refers to Misch Metal, a mixture of rare earths) at point 16, where the energy of absorption $Q_4$ is released. The refrigerant and the regenerator are then cooled to the starting points (point 10 and point 12). The cycle can then be repeated. According to G. G. Libowitz and A. J. Maeland, *The Journal of the Less Common Metals*, Vol. 131, p. 275, (1987), if the heat losses and the sensible heats are neglected, the maximum theoretical value for the coefficient of performance (COP) of these conventional hydride refrigeration systems is:

$$COP = \frac{\Delta H \text{ refrigerant}}{\Delta H \text{ regenerator}} \quad (1)$$

Because the enthalpy of the refrigerant (the numerator) in these systems is always smaller than the enthalpy of the regenerator (the denominator), the COP is always less than 1.

SUMMARY OF THE INVENTION

(Disclosure of the Invention)

The present invention relates to an apparatus and method for improving the coefficient of performance (COP) and the kinetics of hydrogen-driven heat pump hydride refrigeration and heating, particularly metal hydride refrigeration and heating.

The technology described here makes significant advances in hydrogen-driven hydride heat pumps which avoid the problem of global warming due to the discharge of CFC refrigerants into the atmosphere. In addition, this technology will have higher COPs, which will reduce the cost of the energy required to run hydride driven air conditioners and refrigerators as well as hydride driven heaters.

In accordance with the present invention, there is provided an apparatus and method for refrigeration and heating. The apparatus of the invention comprises a refrigerant hydride with a first predetermined van't Hoff curve, and a regenerator hydride with a second predetermined van't Hoff curve. The apparatus further comprises the two van't Hoff curves crossing at a preselected temperature and pressure with regeneration of the regenerator hydride occurring at a temperature above the crossing of the van't Hoff curves. The invention further preferably comprises metal hydrides for the refrigerant and regenerator. The preferred invention includes hydrides with predetermined van't Hoff curves, whereby the regenerator hydride's predetermined van't Hoff curve is steeper than the refrigerant hydride's predetermined van't Hoff curve.

In an alternate embodiment of the invention, the apparatus comprises one set of refrigerant and regenerator hydrides and a second set of refrigerant and regenerator hydrides. In the alternative apparatus, the cycles operate in alternating sequence to each other. While the refrigerating cycle is occurring in the first set, the regenerating cycle is taking place in the second set. Once that cycle is completed, the reverse sequence occurs.

The preferred invention further comprises separate containers for the refrigerant hydride and regenerator hydride. The containers further comprise hydrogen conveying structure and structure for conducting heat from the hydrides to the containers. The hydrogen conveying structure preferably comprises apertures small enough so the hydrides cannot escape, but large enough for hydrogen passage. The preferred apparatus contains two structures for transferring heat. The first structure for transferring heat, preferably comprises structure for unidirectional transfer of the heat of absorption of the refrigerant hydride to the regenerator hydride which supplies a major fraction of the heat required for regeneration of the regenerator hydride. The second heat transfer structure acts as a thermal diode for unidirectional transfer of heat from a cold space to the refrigerant hydride during the refrigerating cycle. The heat transfer structures can comprise circulating fluid apparatus. The preferred heat transfer structures preferably comprise heat pipes. The preferred heat pipe structure comprises a working fluid, a wick structure, and pipe enclosure.

The apparatus preferably further comprises a phase change material. The alternative apparatus comprises mixing the phase change material into the refrigerant hydride. In the preferred embodiment of the invention, the phase change material comprises a phase change material whose phase change temperature corresponds to a lowest temperature of operation of a cold space. The phase change material preferably comprises a member selected from the group consisting of paraffins, inorganic salts, organic salts, and clathrate hydrates. The apparatus preferably further comprises containers for storing the phase change material. The preferable container places the phase change material in thermal contact with the refrigerant hydride. The phase change material container can comprise a container with the phase change material interspaced with a heat transfer structure. The phase change material container can also comprise a container with the phase change material interspaced with the refrigerant hydride. The apparatus further preferably comprises structure for externally heating the regenerator hydride preferably from a member selected from the group consisting of hydrocarbons, solar and electric heat sources.

The preferred apparatus further comprises a structure for controllably transferring hydrogen gas between the refrigerant hydride and the regenerator hydride. The apparatus can further comprise a valve for the controllable transfer of hydrogen gas. The preferred apparatus further comprises structure for removing heat from the regenerator hydride and the refrigerant hydride after hydrogen desorption by the regenerator hydride is complete.

The method of the invention is preferably practiced in refrigeration and comprises desorbing hydrogen gas from a refrigerant hydride by heat transferred from a cold space; controllably transferring hydrogen gas from the refrigerant hydride to a regenerator hydride; absorbing hydrogen gas by the regenerator hydride; heating the regenerator hydride above a predetermined temperature at which the van't Hoff curves of the refrigerant and regenerator hydrides cross; desorbing hydrogen gas from the regenerator hydride by heat transferred from the refrigerant hydride; further heating the regenerator hydride to fully desorb hydrogen gas from the regenerator hydride; controllably transferring hydrogen gas from the regenerator hydride to the refrigerant hydride; absorbing hydrogen gas by the refrigerant hydride above the predetermined temperature; cooling the refrigerant hydride and regenerator hydride to room temperature; and repeating all the above steps.

The preferred step of desorbing hydrogen gas from a refrigerant hydride by heat transferred from a cold space comprises absorbing heat from a cold space to a solid phase change material; melting the phase change material at a preselected temperature; continued absorbing of heat by the phase change material at a constant temperature until all of the solid phase change material is melted; transferring heat from the melted phase change material to the refrigerant hydride; and solidifying the phase change material from heat transferred from the desorbing refrigerant hydride.

The preferred method also comprises the steps of providing a refrigerant hydride with a first predetermined van't Hoff curve; providing a regenerator hydride with a second predetermined van't Hoff curve; providing that the first van't Hoff curve and the second van't Hoff curve cross at a preselected temperature and pressure; and regenerating the regenerator hydride at a temperature above the crossing of the van't Hoff curves. The preferred step of providing a refrigerant and regenerating hydride comprises providing at least one metal hydride. The steps of providing first and second predetermined van't Hoff curves preferably comprise providing the second predetermined van't Hoff curve being steeper than the first predetermined van't Hoff curve.

The steps of providing a refrigerant hydride and a regenerator hydride can comprise providing a first set of refrigerant and regenerator hydrides and a second set of refrigerant and regenerator hydrides. The step of providing two sets of refrigerant and regenerator hydrides can further comprise the first set of refrigerant and regenerator hydrides operating in reverse sequence to the second set of refrigerant and regenerator hydrides.

The method of the invention preferably comprises providing unidirectional heat transfer. The step of providing heat transfer comprises unidirectional transferring heat of absorption of the refrigerant hydride to the regenerator hydride, which supplies a major fraction of heat required for regeneration of the regenerator hydride and unidirectional transferring of heat from a cold space to the refrigerant hydride during a refrigerating cycle. The method of the invention preferably comprises controlling a lowest temperature of the refrigerant hydride with a phase change material. The controlling step preferably comprises limiting a drop in pressure between the first predetermined van't Hoff curve and the second van't Hoff curve, extending the length of time cold is available by storing the cold in frozen phase change material and controlling a cycle time. The step of selecting a phase change material preferably comprises selecting the phase change material whose phase-change temperature corresponds to the lowest temperature of the operation of the cold box.

The method of the invention preferably comprises the step of externally heating the regenerator hydride. The step of externally heating the regenerator hydride can additionally comprise heating the regenerator hydride utilizing a heat source selected from the group consisting of hydrocarbon, solar and electric.

The method of the invention preferably comprises the step of controllably transferring hydrogen gas between the refrigerant hydride and the regenerator hydride. The method additionally further comprises the step of removing heat from both the regenerator hydride and the refrigerant hydride after hydrogen desorption by the regenerator hydride is complete.

One object of the present invention is to provide an alternative refrigeration system which does not use CFCs as the refrigerant.

Another object of the present invention is to provide a hydrogen-driven hydride heat pump refrigeration system with a COP equalling or exceeding conventional CFC refrigeration systems.

Another important object of the invention is to provide hydrogen-driven hydride refrigeration and heat pump systems having a higher COP than existing hydrogen-driven hydride refrigeration and heat pump systems.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENT

(BEST MODES FOR CARRYING OUT THE INVENTION)

The following is given in terms applying to a refrigerator; however the disclosed refrigeration system may be employed in other cooling systems, both commercial and residential. This includes, but is not limited to buildings and auto air conditioners, freezers, and the like. The apparatus and method can also be used for heating systems.

Figure 1:
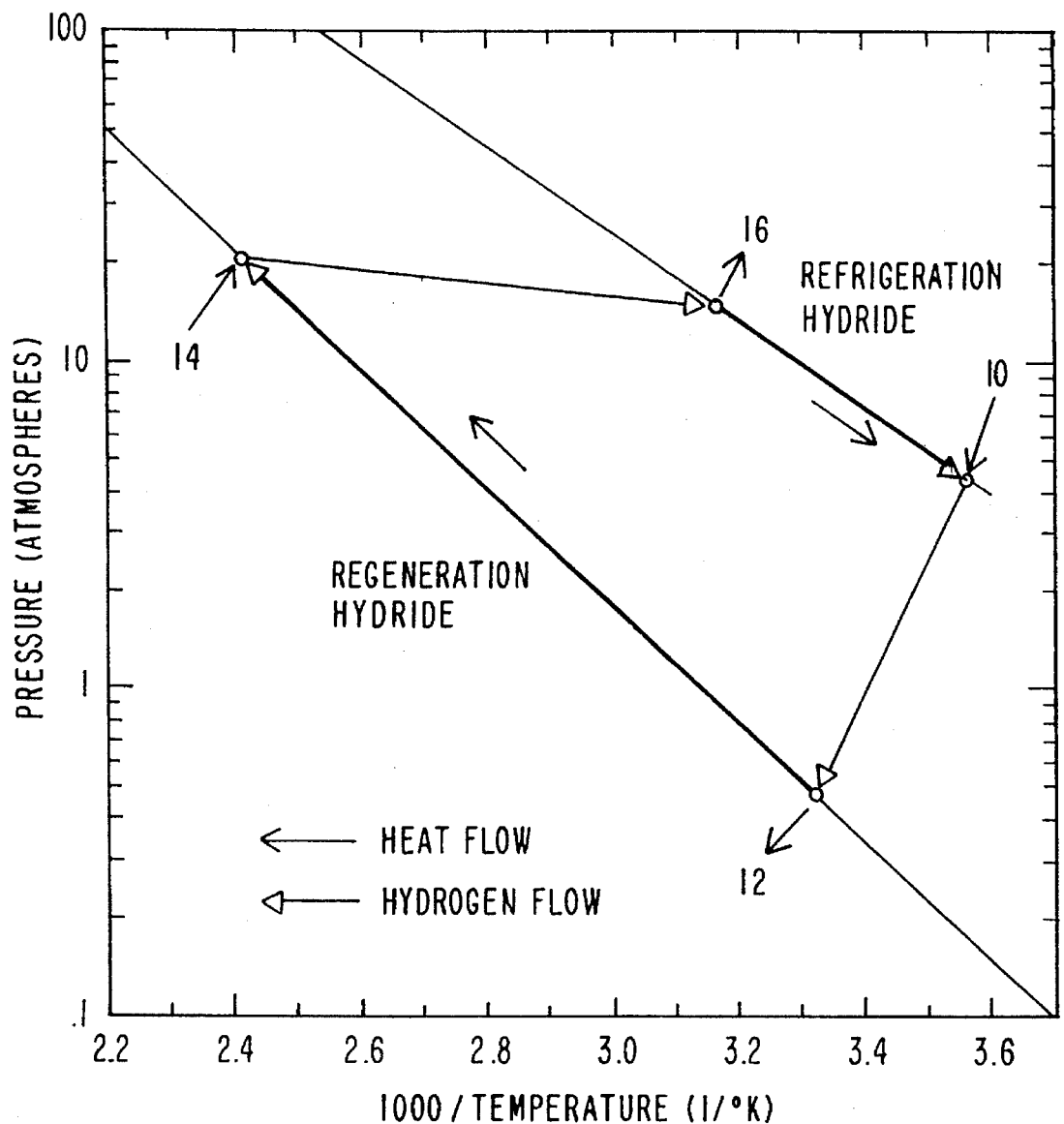
FIG. 1 is a plot of prior art van't Hoff curves of a hydride pair for a conventional hydride refrigeration cycle.
Figure 2:
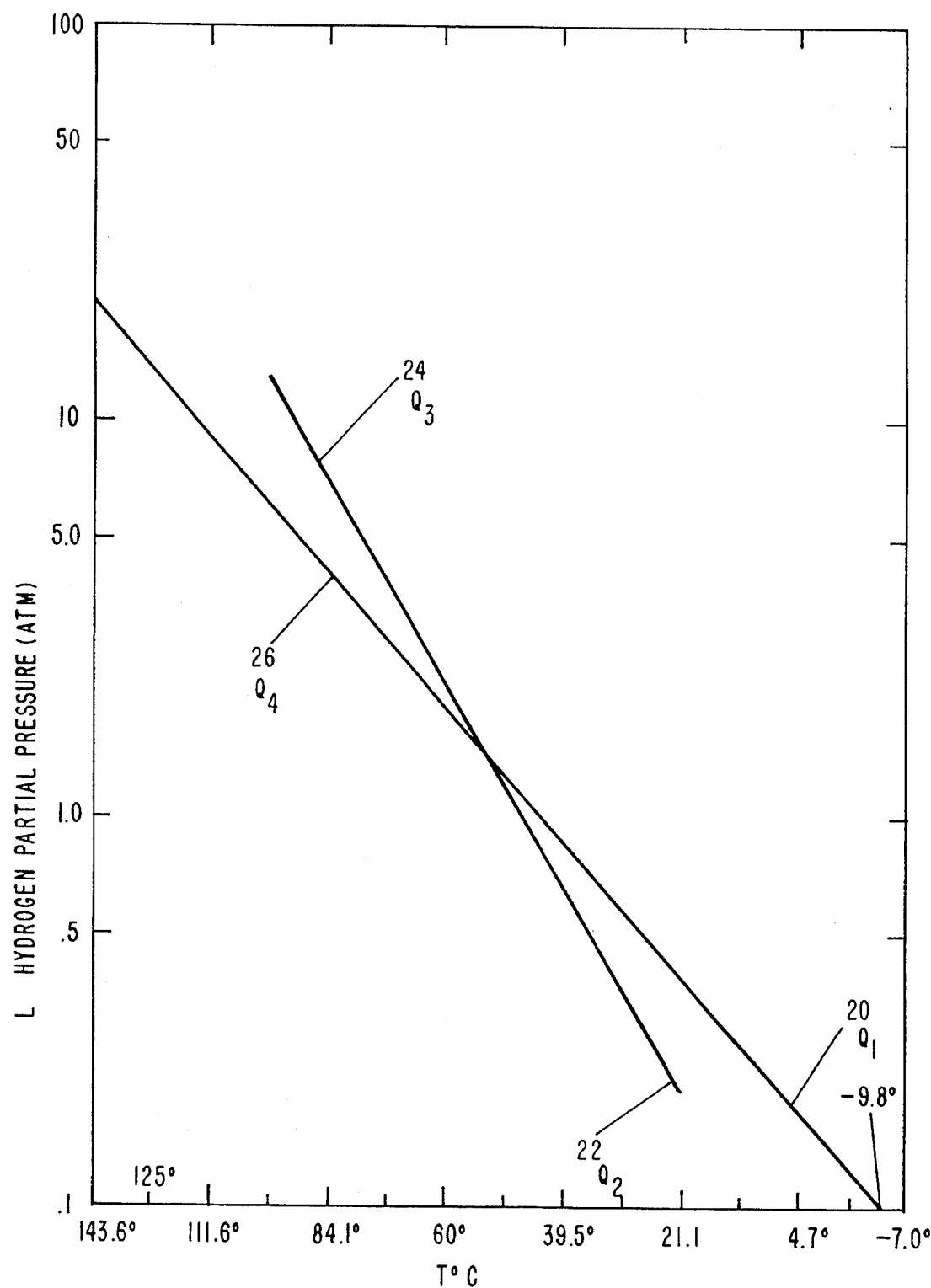
FIG. 2 is a plot of van't Hoff curves of a hydride pair with a regenerating step above the crossing of the curves.

The COP of hydrogen-driven hydride heat pumps can be greatly increased by using two hydrides whose van't Hoff curves cross at a selected temperature, as shown in FIG. 2, resulting in a superior performance over those hydrides currently in use, where the van't Hoff curves are essentially parallel, as shown in FIG. 1 (prior art). Crossing the van't Hoff curves allows the energy of hydrogen absorption by the refrigerant (occurring during the hydrogen recharging step (see point 26 in FIG. 2)) to be transferred back to the desorbing regenerator hydride (see point 24), thereby supplying a very large proportion of the energy required for regeneration. For a conventionally operated hydride heat pump cycle, such energy (represented by $Q_3$ at point 14 in FIG. 1 of the prior art) must be supplied entirely from outside sources such as electrical heat, gas or solar. While this approach for increasing the COP of hydride heat pumps has been previously incorporated by others into liquid based absorption refrigeration systems, it cannot be used with the conventional configuration of hydrogen-driven hydride heat pump refrigerators. In the conventional hydrogen-driven hydride heat pump, the energy generated by hydrogen absorption by the refrigerant must occur at a low temperature and therefore cannot be transferred to the regenerator hydride, which requires a higher temperature in order to decompose and supply hydrogen to the refrigerant at a higher pressure (point 14 in FIG. 1). In this invention, hydrogen is transferred from the high pressure (see point 24 in FIG. 2) to a lower pressure (see point 26 in FIG. 2) while the energy of absorption, generated at the refrigerant and occurring at a higher temperature (see point 26 of FIG. 2) is being transferred back to the desorbing regenerator hydride at a lower temperature (see point 24 of FIG. 2).

Considering only the maximizing of the COP of the heat pump system, one can choose a pair of hydrides which minimize the amount of additional energy required to regenerate the refrigerant hydride. This amount of energy is in addition to that quantity which is returned to the regenerator hydride from the recharging refrigerant.

Consequently, setting aside heat losses to the surroundings, the amount of additional energy required is the difference between the enthalpy changes between the two hydrides. This difference is manifested on the van't Hoff curves by the slopes of the curves. Since the COP is defined as the amount of energy absorbed during the refrigeration step divided by the amount of energy required to regenerate the hydrogen in the refrigerant plus the sensible heats required, the smaller the denominator, the larger the COP. Therefore, the smaller the difference between the enthalpies constituting the pair of hydrides, the smaller the amount of additional energy required and the larger the COP. The ideal system requires a pair of hydrides with van't Hoff curve slopes differing very little from one another.

The COP of conventional hydride driven refrigerators is defined as:

$$COP = \frac{n\Delta H_{ref} - C_{ref} M_{ref}(T_m - T_l)}{n\Delta H_{reg} + C_{reg} M_{reg}(T_h - T_m)} \quad (2)$$

where n is the number of moles of hydrogen transferred between the hydrides, $\Delta H_{ref}$ and $\Delta H_{reg}$ are the enthalpies of the refrigerant and regenerator hydrides of mass $M_{ref}$ and $M_{reg}$, respectively, and $T_h$, $T_m$, and $T_1$ are the absolute temperatures for the high, middle, and low temperatures of FIG. 1. $C_{ref}$ and $C_{reg}$ are the specific heats of the refrigerant and regenerator hydrides, respectively.

In the case where the hydrides cross, as shown in FIG. 2, $$COP = \frac{n\Delta H_{ref}}{[n\Delta H_{reg} - n\Delta H_{ref}] + \Sigma\, m_i C_p \Delta T} \quad (3)$$

where $\Delta H_{ref}$ is the enthalpy change during absorption or desorption of hydrogen from the refrigerant hydride; $\Delta H_{reg}$ is the enthalpy change during desorption of hydrogen from the regenerator hydride; and $m_i C_p \Delta T$ represents sensible heats required to raise the hydrides from ambient to the regeneration temperature.

However, maximizing the COP may reduce the optimization of other important factors which are required for best overall performance of the system. For example, the kinetics of the hydrogen and energy transfer between the hydrides are affected when the van't Hoff curves are substantially parallel. As an example, consider a pair of hydrides whose van't Hoff curves have substantially similar slopes: the consequence is that at both refrigeration ends of the curves, as well as during the regeneration step, the pressure difference between the hydrides is very low, reducing the rate of transfer of the hydrogen between the hydrides. Depending on the rate of "cold" lost to the surroundings, the refrigeration produced by hydrogen desorption may not be fast enough to accommodate such loss, resulting in the refrigerator warming up. Similarly, a small pressure difference between the hydride curves during the regenerating step slows the rate of recharging of the refrigerant, thereby extending the length of the cycle. Again, resulting in the refrigerator warming up.

On the other hand, one reason for using two hydrides whose van't Hoff curves cross more sharply is to permit the return of thermal energy from the hydrogen absorbing hydride (the refrigerant) to the regenerator hydride as rapidly as possible. Even though heat pipes can theoretically accomplish this task when the difference in temperature between the condensing and the boiling ends of the heat pipe is only a few degrees, the rate of heat transfer is increased as the temperature difference increases.

Another trade-off that must be considered when selecting two hydrides with substantially similar slopes is that it limits the cooling capacity of the system. Again, considering the example of FIG. 2, it can be seen that if the slopes are substantially similar, the extent of the pressure difference between the hydrides during the refrigeration step is very small, so that as the temperature of the absorbing regenerator hydride increases, the pressure difference decreases even further. The result of this is that within a small— and therefore difficult to control—temperature difference, the partial pressures above both hydrides equilibrate, shutting off the refrigeration step. This may occur well before all of the hydrogen which has been charged into the refrigerant has been desorbed, thus limiting the cooling capacity of the heat pump.

Consequently, a trade-off between these undesirable effects and an increased COP afforded by crossing of the van't Hoff curves is necessary.

Other requirements in selecting hydrides include rapid and similar reaction rates (absorption and desorption) between the hydride and hydrogen and the high hydrogen storage capacities of the hydrides. It is also desirable that the pressure plateau length of pressure-composition isotherms have little or no slope (as exhibited by many hydrides) and a minimum hysteresis effect (i.e., different pressure values for absorption and desorption).

In almost all studies of metal hydride heat pumps, modifications of the intermetallic compound hydride, $LaNi_5H_6$, have been considered for use where there has been some substitution of either the La or Ni. For example, Misch metal is substituted for La and/or small amounts of Al, Fe, Mn or a combination of these is substituted for some of the Ni, e.g., $MmNi_{4.2}Al_{0.1}Fe_{0.7}$. (For example, see *The Journal of the Less Common Metals*, Vol. 174, p. 1092 (1991); Vol. 131, p. 225, p. 385 (1987); Vol. 104, p. 259, p. 307 (1984).) However, these hydrides offer a limited range of operating conditions. Recently, hydrides of a group of vanadium-based solid solution alloys have been considered for use in refrigeration heat pumps. These alloys have the general formula $(V_{1-x}Ti_x)_{1-y}M_y$, where M is usually a Group VI to VIII metal such as Fe, Ni, Cr, or Mn. These alloy hydrides have higher values of $\Delta H$ than most intermetallic compound hydrides (10 kcal/mole $H_2$ as compared to 7 kcal/mole $H_2$ for most hydrides of intermetallic compounds). However, the hydrogen pressure of the alloy hydrides are sufficiently high for efficient hydrogen transfer in a heat pump because of their higher (negative) entropies of formation (see the van't Hoff Equation 12). Since these alloys are solid solutions, their compositions can vary over a wide range. For example, the value of x (i.e., the V/Ti ratio) may change as well as the value of y and the nature of M (i.e., Fe, Ni, etc.). Consequently, a large number of hydrides can be prepared which make possible the design of hydrides with specific thermodynamic properties. Therefore, these alloys are of particular value in the van't Hoff crossed curves concept of this invention, where it is desirable to optimize the thermodynamic properties of the two hydrides used.

There are approximately 200 known intermetallic compounds that form hydrides. Except for $LaNi_5$ (and its modifications) most have received little consideration for use in hydride heat pumps. One group which may be utilized in accordance with the invention is the Laves phase hydrides, of which there are more than 70. These intermetallic compounds have the general formula, $AB_2$, where A is usually a rare earth, Group III or Group IV metal and B is usually a Group VIII metal, but may also be a metal from Groups V, VI or VII.

The amount of cooling resulting from a hydride driven heat pump refrigerator depends on several variables, the more important of which are: a) the amount of hydrogen that can be charged into the hydride; b) the choice of the lower refrigerant temperature; and c) the cycle time. On the other hand, the COP depends on the nature of those hydrides chosen which determine the enthalpy of the system and hence the relationship between the energy absorbed during refrigeration and the energy required for regeneration.

The present invention is primarily concerned with improving the coefficient of performance (COP) of hydride refrigeration systems. Also involved is the use of heat pipes and phase change materials within a hydride refrigeration system, thereby improving the kinetics of the refrigeration system.

A heat pipe is capable of transferring large amounts of heat through a small area with little temperature change and requiring no external power or control.

Figure 3:
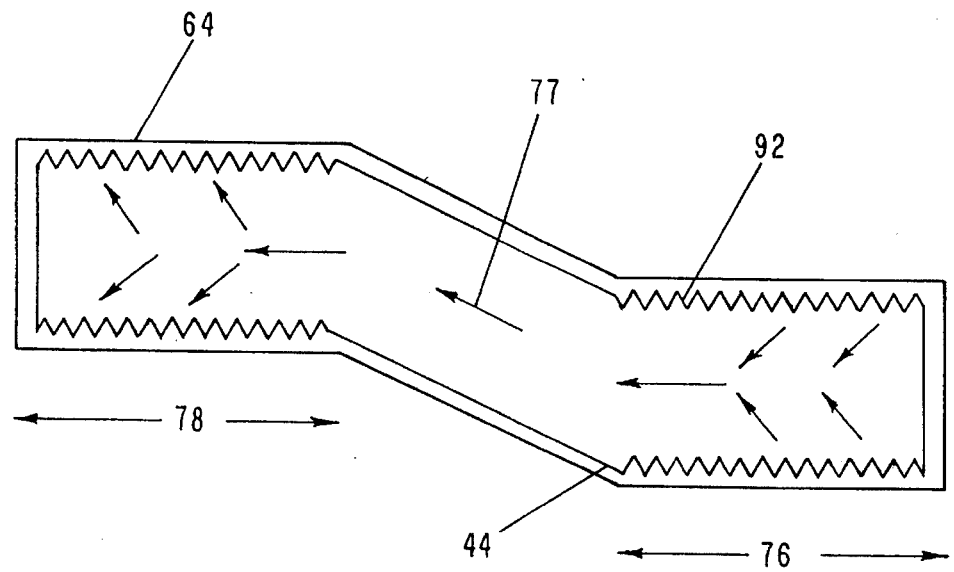
FIG. 3 is a schematic diagram of the preferred heat pipe.
Figure 7:
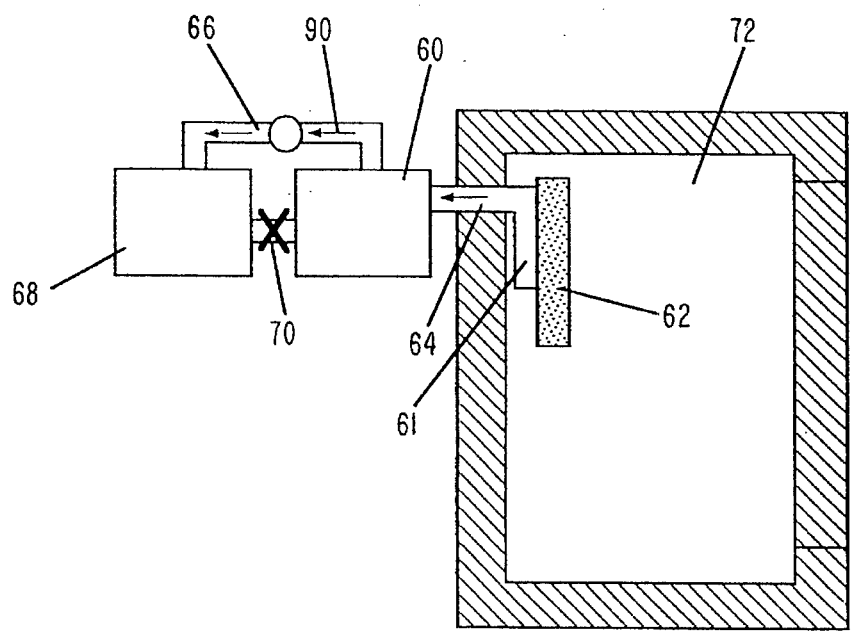
FIG. 7 is a schematic diagram of the preferred refrigeration step.

FIG. 3 is a schematic drawing of the preferred unidirectional heat pipe 64 that connects the refrigerant hydride 60 to the cold space 72 of FIG. 7. Although a number of different types of more complex unidirectional heat pipes could be used, a simple and cost-effective gravity-assisted heat pipe with a grooved wick 92 is shown. In this heat pipe the evaporator 76 is located below the condenser 78. The grooved wick 92 does not pump liquid uphill. A simple thermosyphon, with no wick, could also be used, but with a slightly reduced thermal conductance.

When heat pipe 64 is made, air is evacuated from the pipe and a liquid 44, chosen for the specific application, is introduced in sufficient quantity to saturate wick 92. When heat is applied to evaporator 76, liquid 44 evaporates, enhanced by grooved wick 92. Hot vapor 77 flows to condenser 78 and condenses, and liquid 44 returns to evaporator 76 by gravity-assisted flow. Thus, gravity-assisted unidirectional heat pipe 64 provides high thermal conductance in the normal or forward direction.

If elevated condenser 78 is heated and the temperature difference reverses, liquid 44 in condenser 78 quickly drains back to evaporator 76, condenser 78 drys out and the evaporation heat transfer stops. Thus, heat transfer in the reverse direction is essentially stopped. Such gravity-assisted unidirectional heat pipes 64 are also called thermal diodes.

The preferred embodiment of the refrigeration system employs two unidirectional heat pipe structures 70 and 64 of FIG. 7. Unidirectional heat pipe 70 transfers heat between hydrides 60 and 68, while heat pipe 64 connects refrigerant hydride 60 to heat exchanger 61 and phase change material 62 in cold space 72. The operating temperatures of heat pipes 64 and 70 range from approximately 125° C. to −18° C. for a refrigerator with a freezer. However, other temperature ranges can be chosen depending on the refrigeration required. Unidirectional heat pipe 64 functions as a thermal diode, preventing heat transfer into cold space 72 when the temperature of refrigerant hydride 60 exceeds that of cold space 72. Unidirectional heat pipe 70 also functions as a thermal diode, transferring heat of absorption from refrigerant hydride 60 to regenerator hydride 68 during the regeneration phase of the cycle, but preventing heat flow in the reverse direction during the refrigeration phase of the cycle.

P. V. Hale, J. J. Hoover, and M. M. O'Neill, in "Phase Change Materials Handbook," *NASA Report: NASA-CR-613-63*, p. 1 (1971), identified a number of potentially suitable phase-change materials for energy storage. Researchers have investigated phase-change materials in the categories of eutectic alloys, paraffins, non-paraffin organic compounds, salt hydrates, carbonates, nitrates, polyhydric alcohols and metals. In order for a phase-change material to be attractive for use in energy storage it should possess (1) high heat of transformation; (2) high specific heat; (3) high density; (4) low hazard and toxicity; and (5) low corrosion rate. Lastly, it should be inexpensive.

The forte of a phase change material (PCM) is its capacity for storing large amounts of thermal energy at a constant temperature. In those materials where the phase transition is between a solid and melt, the temperature of the reaction is fixed at the temperature of melting. The temperature can increase only after all of the PCM has melted. Paraffins are a convenient PCM in hydride systems. Because the melting temperatures vary with the number of carbon atoms on the hydrocarbon chain, one can select the phase change temperature from a series of paraffins. Other PCMs which operate at low temperatures can also be used.

Because most PCMs are poor thermal conductors, they must be placed in direct contact with the material whose heat is to be transferred. Consequently, the distance over which heat transfer occurs must be minimized.

An effective approach to increasing the performance of the hydride heat pump refrigerator in the current invention is to use PCMs to control the lowest temperature the refrigerant hydride is permitted to reach. By using the PCM in this manner, one can achieve three objectives:

1. limiting a drop in the pressure differential between the refrigerant hydride and the regenerator hydride during the refrigeration step;
2. energy stored in the frozen PCM due to cooling by the refrigerant hydride extends the length of time "cold" is available in the system, smoothing the temperature fluctuations of the process, and making the use of the single cycle process more feasible; and
3. the use of a PCM that fixes the temperature of either the regenerator hydride or the refrigerant hydride controls the kinetics of hydrogen transfer because it controls the pressure differential between the hydrides. Thus, the cycle time is controlled by the choice of phase change temperature of the PCM.

Figure 4:
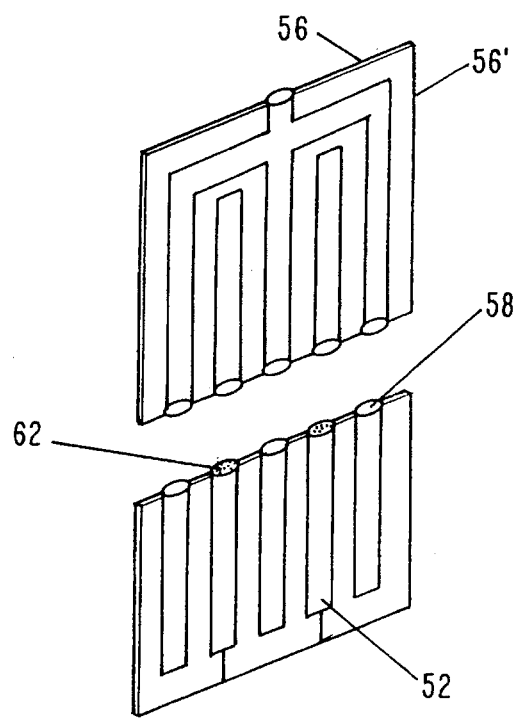
FIG. 4 is a perspective cutout view of a preferred PCM panel design.
Figure 5:
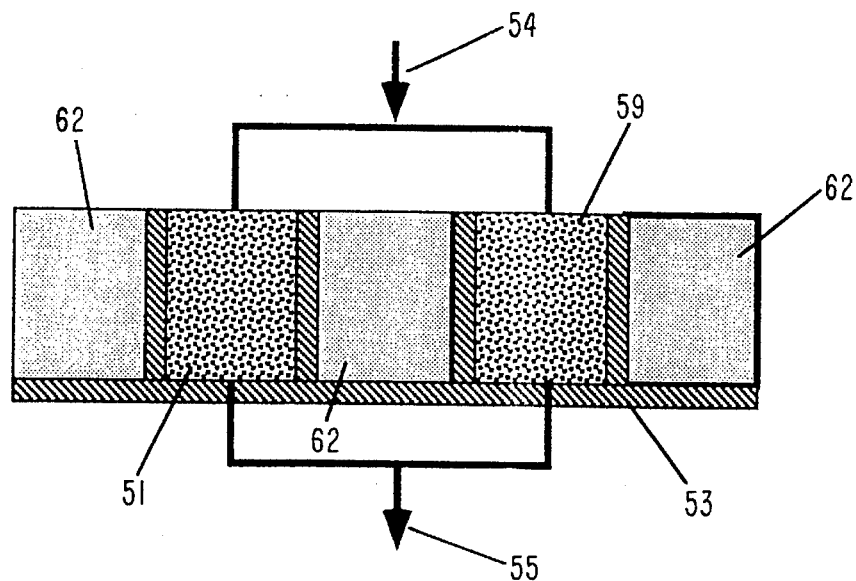
FIG. 5 is an alternate PCM package.

The PCM storage package comprises designs to best transfer heat from and to the surface of the PCM storage package. Two different embodiments are shown in FIGS. 4 and 5. FIG. 4 shows the preferred flat panel design in which PCM 62 is stored within small tubes 52, which are alternately spaced with unidirectional heat pipe tubes 58 (either 64 or 70 of FIG. 7). The flat panel is made of two thin convoluted plates which are welded together 56 and 56', allowing PCM 62 to be stored in the convoluted volume. The material preferred for the flat panel is a strong, thermally conductive material, such as aluminum or the like, which transmits heat evenly and rapidly. In the preferred embodiment, the PCM storage system with its heat pipe attachment is the only heat transfer device contained within the cold box and freezer compartment. Such a heat transfer and storage system can be placed within the cold box in the form of shelving.

An alternate approach to controlling the temperature drop of the refrigerant hydride is to combine the PCM and the hydride outside the cold space. Such an embodiment is shown in FIG. 5, where a block diagram describes PCM 62, hydride 51 (either 60 or 68 of FIG. 7), and heat conductor 53 combined in one package for heat transfer. Hydride compartments 59 each have hydrogen gas inlet 54 and outlet 55 passages so that hydrogen can flow through hydride 51.

Figure 6:
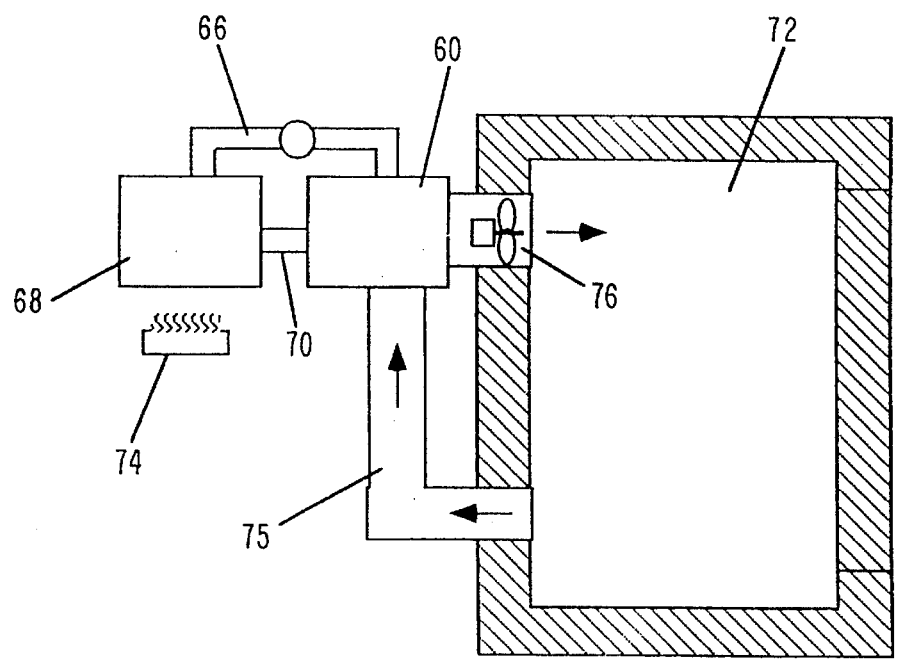
FIG. 6 is a refrigeration apparatus with a PCM/hydride embodiment of FIG. 5.

The application of the PCM-hydride package shown in FIG. 5 is shown in FIG. 6, where a low temperature PCM 62 (e.g., approximately 5° C.) is combined with refrigerant hydride 51 of FIG. 5, to form heat exchanger 61 through which air may be circulated. Refrigerant hydride heat exchanger 61 has inlet and outlet air ducts 75 and fan 76 to circulate and cool air from cold insulated space 72. Heat exchanger 61 is connected to regenerator hydride 68 by hydrogen flow pipe 66 and unidirectional heat pipe 70. External heat source 74 is provided for heating regenerator hydride 68.

To explain the operation of the PCM as well as the hydride refrigeration process, reference is made to FIG. 7 for the preferred cooling mode of operation of the invention. During the cooling part of the cycle, the temperature of the molten PCM 62 drops due to the decomposition of refrigerant hydride 60. PCM 62 continues to cool until its temperature is arrested at the phase change temperature, e.g. 5° C. Heat from cold box 72 continues to be absorbed by PCM 62 at a constant temperature of, e.g. 5° C., while refrigerant hydride 60 continues to cool PCM 62 via unidirectional heat pipe 64. Refrigerant hydride 60 decomposes, cools PCM 62 and transfers hydrogen through open conduit 66 to absorbing regenerator hydride 68.

Figure 8:
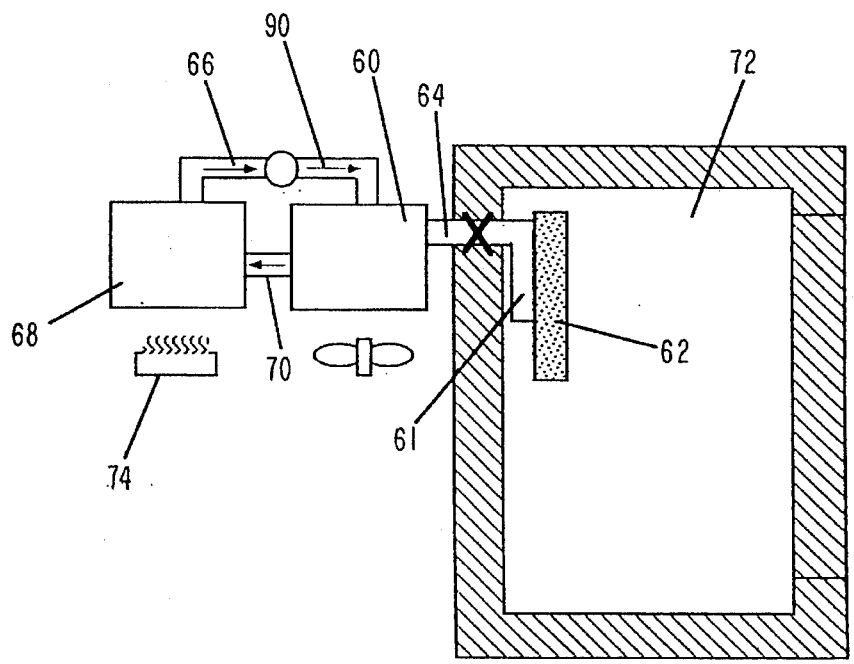
FIG. 8 is a schematic diagram of the preferred regenerating step.

During the regenerative part of the preferred cycle, shown in FIG. 8, fully charged regenerator hydride 68 decomposes and releases hydrogen by using heat of absorption supplied by external heat source 74, in addition to heat recovered simultaneously from refrigerant hydride 60 as it is being recharged. This energy from refrigerant hydride 60 is transferred to regenerator hydride 68 via unidirectional heat pipe 70. The hydrogen released by regenerator hydride 68 is transported back to refrigerant hydride 60 via conduit 66. The cooling cycle is then ready to be repeated.

Figure 12:
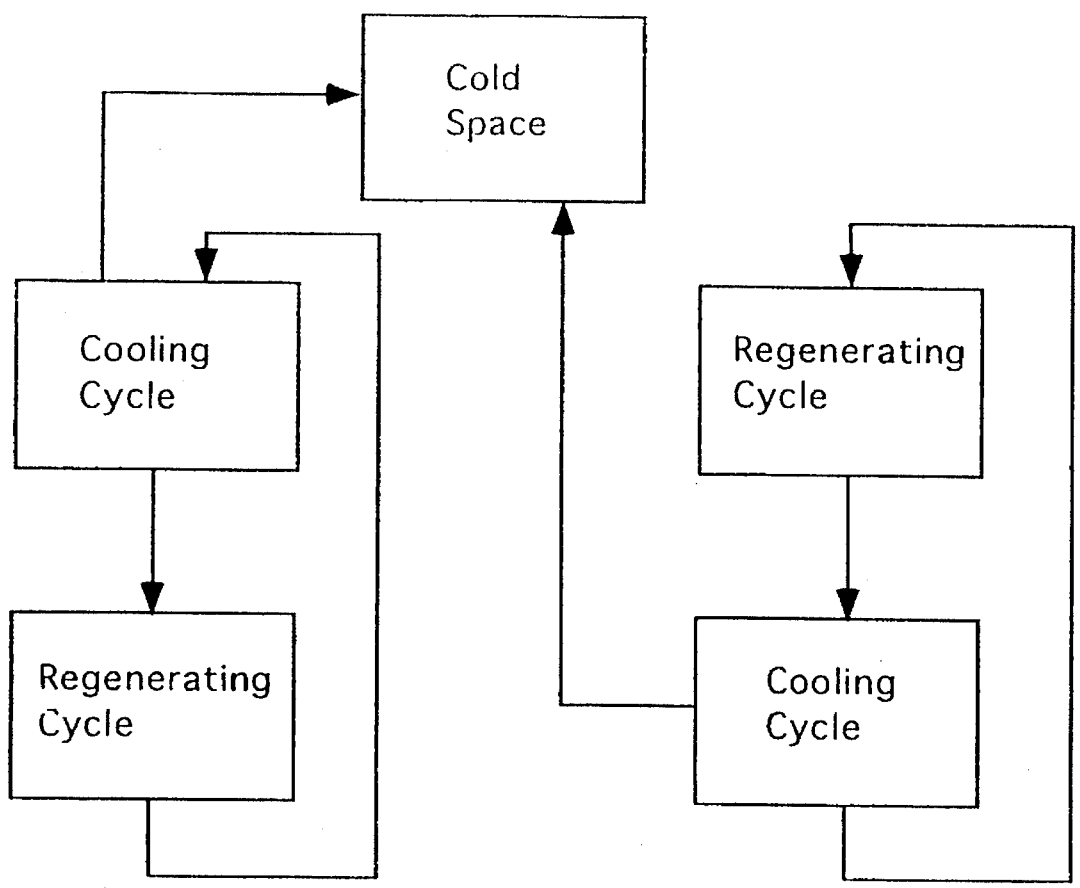
FIG. 12 is a diagram of the alternative split cycle apparatus.

In order to reduce the cycle time of the refrigeration process, a two-cycle operation can also be utilized (see FIG. 12). In this alternative mode, two sets of hydrides (Hydride Set #1 and Hydride Set #2) are used in alternating sequence to each other. As soon as all of the hydrogen is depleted from one refrigerant hydride and the cooling action ceases, the second refrigerant hydride begins its cooling operation. Meanwhile, the regenerator hydride in the first set is desorbing hydrogen and begins to recharge the refrigerant hydride. Following this step the cycles are repeated. The two hydride sets can be identical or different hydrides can be used so one hydride set can cool to colder temperatures, e.g., −20° C., to cool a freezer compartment while the other can cool to, e.g., 5° C., for the refrigerator compartment.

Figure 9:
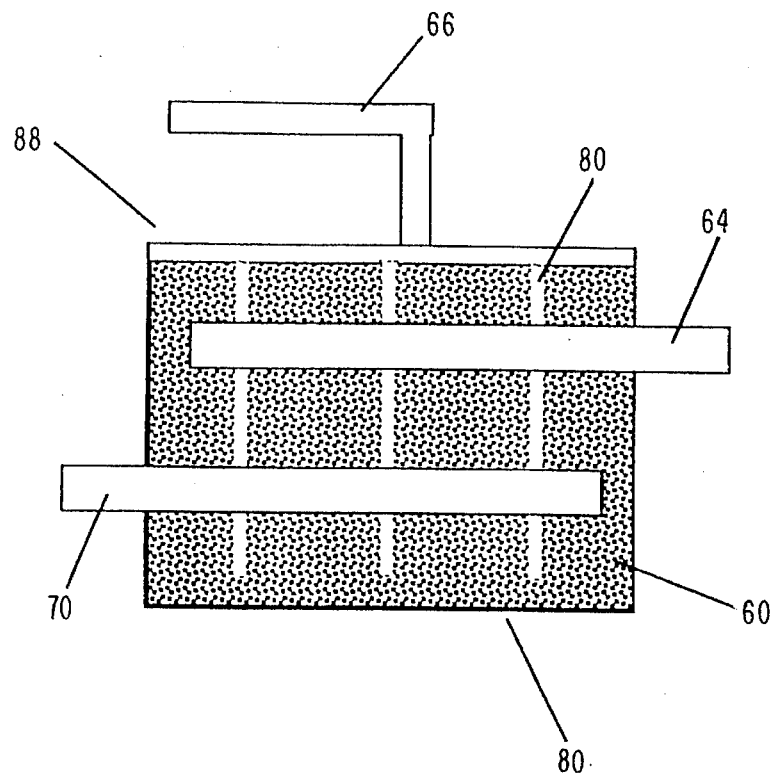
FIG. 9 is a cutout section of the preferred refrigerant hydride container.

A major problem in using metal hydrides is their poor thermal conductivities. A hydride container design to surmount this problem is shown in FIG. 9. FIG. 9 is a cutout section of preferred refrigerant hydride container 88 showing hydride 60 compressed in heat transfer relation with heat pipes 64 and 70 and with apertures 80 for egress and access of hydrogen. Hydride 60 is compressed to form a porous structure in package 88. Sufficient space for hydrogen passage is allowed at top 67 of container 88 to allow hydrogen to flow to inlet and outlet pipe 66, which is connected to regenerator hydride 68, shown in FIG. 7. Large surfaces are provided for efficient transfer of hydrogen into and out of hydride 60. Tight contact between hydride 60, outer container 88, and heat pipes 64 and 70 is important to reduce thermal contact resistance.

Figure 10:
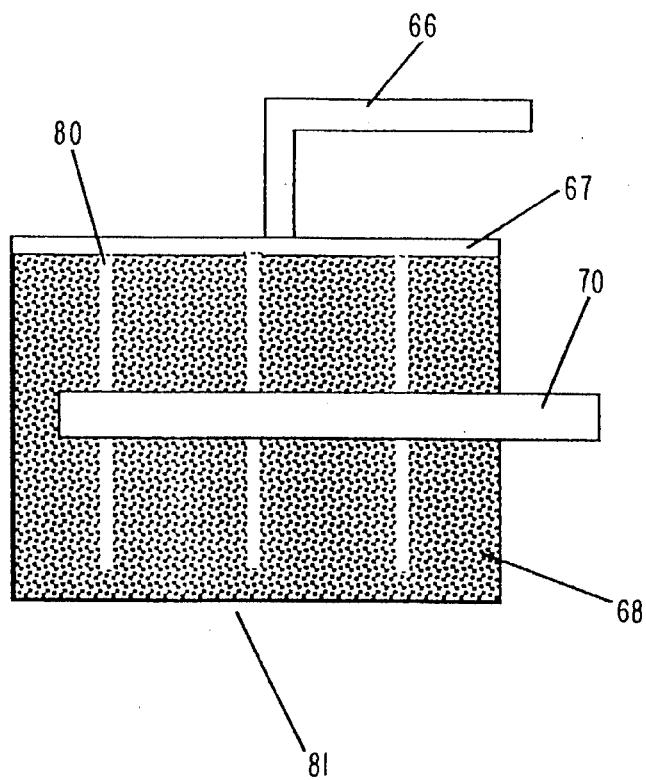
FIG. 10 is a cutout section of the preferred regenerator hydride container.

FIG. 10 is a side cutout view of preferred regenerator hydride container 81, which contains regenerator hydride 68 and unidirectional heat pipe 70. This embodiment's construction is substantially similar to FIG. 9.

Alternatively, porous metal hydride compacts can be utilized, whereby hydride powders 60 and 68 are mixed with powdered materials of high thermal conductivity and compacted into a container around heat pipes 64 and 70 to provide efficient heat transfer without sacrificing hydrogen exchange rates into and out of hydrides 60 and 68. Another alternate embodiment of porous metal hydrides and metal powder compacts is to combine them with PCM 62 which is encapsulated in small metal spheres and used as shown in FIG. 9.

EXAMPLES (INDUSTRIAL APPLICABILITY)

The invention is further illustrated by the following non-limiting examples.

EXAMPLE 1

To quantitatively demonstrate the potential magnitude of the increase in performance which can be realized by the hydride heat pump technology of the present invention, a comparison of values of COP of this work is made with the COP of a conventional hydride heat pump. In this example, vanadium hydride ($VH_2$) is used as the regenerator and $M_{Misch\ metal}Ni_{4.15}Fe_{0.85}$ is used as the refrigerant.

The regenerator hydride, vanadium, has a molecular weight of 50.95 grams, a specific heat near 0.1 cal/gram/° C. and an enthalpy change of decomposition of 9.6 kcal/mole $H_2$ (see G. G. Libowitz, U.S. Pat. No. 4,040,410, issued Aug. 9, 1977). At saturation, the weight percent of hydrogen in $VH_2$ is estimated to be close to that of $(V_{0.9}Ti_{0.1})_{0.98}Fe_{0.02}$ and is taken as 1.98%.

Based on one mole of hydrogen, the weight of vanadium metal hydride at saturation would be:

$$2.016=(0.0198)\chi; \chi=102 \text{ grams of hydride} \quad (4)$$

The van't Hoff curve for the $VH_2$ alloy crosses the van't Hoff curve for the Misch metal at approximately 116° C. (see E. L. Houston and G. D. Sandrock, "Engineering Properties of Metal Hydrides," *The Journal of the Less Common Metals*, Vol. 74, p. 435 (1980)). However, in order to achieve sufficient disparity in hydrogen pressure between the regenerator hydride ($VH_2$) and the refrigerant hydride (Misch metal), the regeneration temperature must be above 116° C. For example, an increase of a few degrees Kelvin above 116° C. in these two metal hydrides would result in a difference of tens of atmospheres of pressure. However, for a simple calculation, the temperature of 116° C. is used.

The sensible heat required to raise the temperature of the vanadium alloy from 30° C. to the desorption temperature of 116° C. is:

$$\Delta H=(mass)(C_p)\Delta T=(102)(0.1)(116° C.-30°C.)= 0.877 \text{ kcal} \quad (5)$$

On the other hand, the Misch metal alloy, which is used as the refrigerant hydride, saturates at 1.15 weight percent $H_2$. It has an enthalpy change of 6.0 kcal/mole $H_2$ and a specific heat near 0.1 cal/gram/° C. Again, based on one mole of hydrogen, the weight of the Misch metal hydride is:

$$0.0115\chi=2.016; \chi=175.3 \text{ grams of hydride} \quad (6)$$

The sensible heat required to raise the Misch metal hydride to the hydrogen absorption temperature of 116° C. is:

$$\Delta H=(175.3)(0.1)(116° C.-30° C.)=1.51 \text{ kcal} \quad (7)$$

The total sensible heat for the two hydrides is, therefore, 2.39 kcal. In calculating the COP for this system using the conventional definition:

$$COP = \frac{\text{The Energy Removed By The Refrigerator}}{\text{The Energy Required For The Cycle}} \quad (8)$$

where the numerator is the enthalpy change of the Misch metal hydride of 6.0 kcal/mole $H_2$ and the denominator is the energy required from an external heat source to supply the difference between the energy needed to decompose the regenerative hydride (9.6 kcal) and the energy furnished by the Misch metal hydride during hydrogen absorption (6.0 kcal) is 3.6 kcal. In addition, the denominator contains the sensible heats required to raise both alloys to the regenerative temperature, 116° C. or 389° K., during recharging of the refrigerant.

The COP is therefore:

$$COP = \frac{6.0 \text{ kcal}}{3.6 \text{ kcal} + 2.39 \text{ kcal}} = 1.0 \quad (9)$$

In order to compare this value with the COP of a conventional hydride heat pump, the enthalpy of the refrigerant is divided by the enthalpy of a metal hydride being used as the regenerator, plus the sensible heats required. Since conventional hydride systems use two hydrides with nearly parallel van't Hoff curves, the enthalpy change for the refrigerant (the Misch metal in FIG. 1) is comparable to that of the lanthanum alloy in FIG. 1, since the slopes give the enthalpy change of the reaction. Consequently, this enthalpy change is approximately the same as that of the lanthanum alloy, or 8.1 kcal. Therefore, if the regenerator hydride is raised from 30° C. to a temperature which will give a comparable $\Delta P$ as obtained in the $VH_2$/ Misch metal system, the upper temperature would be close to 215° C. during the recharging part of the cycle, as shown in FIG. 1. Note that the COP of the conventional system was deliberately favored in this example by minimizing the temperature of regeneration in the new invention cycle so that the comparable $\Delta P$ for the conventional system can be achieved at the lowest possible temperature. Consequently, the sensible heat of the regenerator is:

$$\Delta H=(175.3)(0.1)(215° C.-30° C.)=3.24 \text{ kcal.}$$

(In the conventional hydride system there is no need to increase the temperature of the refrigerant during recharging.) The COP of a comparable conventional hydride refrigeration system using these same hydrides is therefore:

$$COP = \frac{8.1 \text{ kcal}}{8.1 \text{ kcal} + 3.24 \text{ kcal}} = 0.71 \qquad (10)$$

For the hydrides chosen in this example, the present invention increases the COP by about ⅓ and places the hydride heat pump system in a comparable position with conventional refrigeration systems.

Larger COPs can be realized in the present invention if the two hydrides are chosen with crossed van't Hoff curves more parallel to each other. This occurs, for example, in the LaNi$_{4.7}$Al$_{0.3}$//(V$_{0.9}$Ti$_{0.1}$)$_{0.98}$Fe$_{0.02}$ system. The van't Hoff curves of these hydrides cross at approximately 100° C., at which point, of course, ΔP =0. However, raising the temperature of the hydrides by as little as 35° C. to 135° C., for example, produces a ΔP for regeneration of about 6 atmospheres. For this combination, the COP is 1.30, representing an increase of 83% by the present invention compared to a conventional system running between similar parameters. Other hydride systems can optimize the advantage of using alloys whose van't Hoff curves cross at a suitable temperature and have substantially parallel slopes which can produce COPs of even higher values.

EXAMPLE 2

Figure 11:
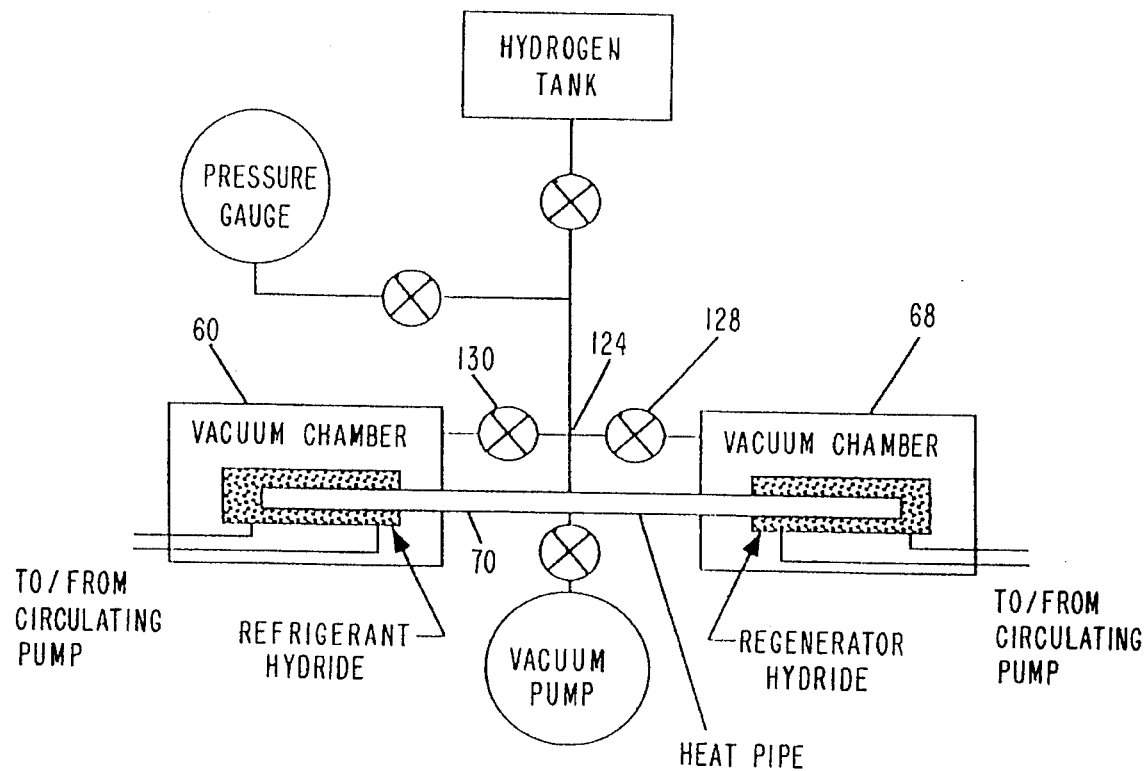
FIG. 11 is a schematic diagram of the test apparatus of Example 2.

The apparatus, shown in FIG. 11, was constructed to demonstrate the increase in the COP of hydride driven refrigerators using the method of the present invention. The apparatus comprised two chambers, one to contain refrigerant hydride 60 and the other to contain regenerator hydride 68, both capable of operating at pressures above 10 atmospheres. The chambers were approximately 4 inches in diameter by 6 inches in length and were interconnected by tube 124 so that they could exchange hydrogen by opening valves 128 and 130. Energy was transferred from refrigerant hydride 60 back to the regenerator hydride 68 via a unidirectional heat pipe 70. The entire apparatus was tilted at an angle of 10°, allowing the ethanol used as the heat transfer medium in heat pipe 70 to return by gravity to the lower end where evaporation occurs when the refrigerant hydride 60 becomes hot from absorption of hydrogen. A series of valves allowed either chamber to be evacuated by a mechanical pump or to be filled with high purity hydrogen. Hydrides 60 and 68 were heated to near 100° C. during the regenerative step to be above the point where the van't Hoff curves crossed. Ethylene glycol was used as the heat exchanger fluid because it has a boiling point above 200° C.

Twenty-five grams of each hydride 60 and 68 were placed in copper trays and covered with a very fine mesh screen to prevent the hydrides (which expand on absorption of hydrogen) from spilling out. LaNi$_5$ was chosen as the refrigerant 60 and (V$_{0.9}$Ti$_{0.1}$)$_{0.98}$Fe$_{0.02}$ was chosen as the regenerator 68. Heat exchanger tubes 70 for the recirculating fluid were soldered to the bottom of the trays. The source and sink for the heat pipe 70 terminated within the trays so that the hydrides 60 and 68 surrounded the ends of the heat pipe 70.

An increase in the COP of the hydride system was qualitatively demonstrated in these experiments by a rise in the temperature of the regenerator hydride 68, above that provided by the external heat source 74, due to the energy of absorption returned to it via the heat pipe 70. Neglecting heat losses and sensible heats, the maximum theoretical COP for this cycle is:

$$COP = \frac{\Delta H_{ref}}{\Delta H_{reg} - \Delta H_{ref}} \qquad (11)$$

For the hydrides used in this experimental example, (V$_{0.9}$Ti$_{0.1}$)$_{0.98}$Fe$_{0.02}$ and LaNi$_5$, the enthalpies are 12 kcal/mole and 7.4 kcal/mole, respectively. Therefore, for the cycle of the present invention the maximum theoretical COP is:

$$COP = \frac{7.4}{12.0 - 7.4} = 1.61 \qquad (12)$$

The maximum COP for the conventional prior art cycle is:

$$COP = \frac{7.4 \text{ kcal/mole}}{12.0 \text{ kcal/mol}} = 0.62 \qquad (13)$$

Consequently, the present invention represents a theoretical increase in the COP of 159%.

From the aforementioned experiment, the ratio of the experimentally determined COP of the prior art and the COP of the present invention, using the above hydride system, was 155%.

EXAMPLE 3

A comparison of conventional heat pumps based on non-crossing van't Hoff curves, and of this invention, is contained in Table 1.

TABLE I

| SYSTEM | COP | ENERGY INPUT | REF |
|---|---|---|---|
| Vapor Compression (freon) | .57–0.84* 1.03* | Electric Electric | 4 3 |
| Compressed Air | <0.38* | Electric | 2 |
| Absorption (ammonia) | 0.52 | Heat | 3 |
| Absorption (lithium-bromide) | 0.79 | Heat | 3 |
| Absorption (silica gel) | 0.6–0.7 0.107 | Heat Heat | 1 2 |
| Metal Hydrides (conventional configuration) | 0.73 1.0+/− 0.4–0.75 <0.5 | Heat Heat Heat Heat | 5 6 7 8 |
| Metal Hydride System of the Present Invention | >1.0 | Heat | This Work |

*The average plant conversion efficiency from fuel to electric power is about 0.38 (ref. 2). Therefore, in order to convert all values of COP to the same basis, the electric values given in the references have been multiplied by 0.38 to make them comparable with thermal input energies.

References for the Table

1. Chemical Engineer's Handbook, 5th Ed., McGraw-Hill, 1973.
2. Marks Standard Handbook for Mechanical Engineers, McQuiston and Parker, Wiley, 1977.
3. Heating, Ventilating and Air Conditioning: Analysis and Design, McQuiston and Parker, Wiley, 1977.
4. Thermodynamics, 3rd Ed., Wark, McGraw-Hill, 1977.
5. The Journal of the Less Common Metals, E. Orgaz and P. Dautzer, vol. 131, p. 385–398 (1987).
6. The Journal of the Less Common Metals, I. Shaft, D. M. Gruen, and G. J. Lamich, vol. 74, pp. 401–409 (1980).
7. The Journal of the Less Common Metals, T. Nishazaki, K. Miyamoto, and D. Yoshida, vol. 89, pp. 559–566 (1983).
8. The Journal of the Less Common Metals, S. Suda, vol. 104, pp. 211–222.

The preceding examples can be repeated with similar success by substituting the generically or specifically described reactants and/or operating conditions of this invention for those used in the preceding examples.

Although the invention has been described with reference to these preferred embodiments, other embodiments can achieve the same results. Variations and modifications of the present invention will be obvious to those skilled in the art and is intended to cover in the appended claims all such modifications and equivalents. The entire disclosures of all references, applications, patents, and publications cited above, and of this corresponding application are hereby incorporated by reference.

What is claimed is:

1. A closed cycle method of refrigeration from a heat pump hydride system comprising the steps of:
   a) desorbing hydrogen gas from a refrigerant hydride by heat transferred from a cold space;
   b) controllably transferring hydrogen gas from the refrigerant hydride to a regenerator hydride;
   c) absorbing hydrogen gas by the regenerator hydride;
   d) heating the regenerator hydride above a predetermined temperature at which the refrigerant and regenerator hydrides van't Hoff curves cross;
   e) desorbing hydrogen gas from the regenerator hydride by heat transferred from the refrigerant hydride;
   f) further heating the regenerator hydride to fully desorb hydrogen gas from the regenerator hydride;
   g) controllably transferring hydrogen gas from the regenerator hydride to the refrigerant hydride;
   h) absorbing hydrogen gas by the refrigerant hydride above the predetermined temperature;
   i) cooling the refrigerant hydride and regenerator hydride to room temperature;
   j) regenerating the regenerator hydride at a temperature above the crossing of the van't Hoff curves; and
   k) providing heat transfer, the heat transfer comprising the substeps of:
      1) unidirectional transferring of heat of absorption of the refrigerant hydride to the regenerator hydride which supplies a major fraction of heat required for regeneration of the regenerator hydride; and
      2) unidirectional transferring of heat from a cold space to the refrigerant hydride during a refrigerating cycle; and
   l) repeating steps a through k.

2. The method of claim 1 wherein the step of desorbing hydrogen gas from a refrigerant hydride by heat transferred from a cold space comprises the substeps of:
   a) absorbing heat from a cold space to a solid phase change material;
   b) melting the phase change material at a preselected temperature;
   c) continued absorbing of heat by the phase change material at a constant temperature until all of the solid phase change material is melted;
   d) transferring heat from the melted phase change material to the refrigerant hydride; and
   e) solidifying the phase change material from heat transferred from the desorbing refrigerant hydride.

3. A method of heat pump hydride refrigeration comprising the steps of:
   a) providing a refrigerant hydride with a first predetermined van't Hoff curve;
   b) providing a regenerator hydride with a second predetermined van't Hoff curve;
   c) providing the first van't Hoff curve and the second Van't Hoff curve cross at a preselected temperature and pressure;
   d) regenerating the regenerator hydride at a temperature above the crossing of the van't Hoff curves; and
   e) providing heat transfer, the heat transfer comprising the substeps of:
      1) unidirectional transferring of heat of absorption of the refrigerant hydride to the regenerator hydride which supplies a major fraction of heat required for regeneration of the regenerator hydride; and
      2) unidirectional transferring of heat from a cold space to the refrigerant hydride during a refrigerating cycle.

4. The method of claim 3 wherein the step of providing a refrigerant hydride and a regenerator hydride comprises providing at least one metal hydride.

5. The method of claim 3 wherein the steps of providing first and second predetermined van't Hoff curves comprises providing the second predetermined van't Hoff curve with a steeper slope than the first predetermined van't Hoff curve.

6. The method of claim 3 wherein the steps of providing a refrigerant hydride and a regenerator hydride comprise:
   a) providing a first set of refrigerant and regenerator hydrides; and
   b) providing a second set of refrigerant and regenerator hydrides.

7. The method of claim 6 wherein the step of providing two sets of refrigerant and regenerator hydrides comprises the step of operating the first set of refrigerant and regenerator hydrides in alternating sequence to the second set of refrigerant and regenerator hydrides.

8. The method of claim 3 further comprising the step of controlling a lowest temperature of the refrigerant hydride with a phase change material.

9. The method of claim 8 wherein the step of controlling a lowest temperature of the refrigerant hydride with a phase change material comprises:
   a) limiting a pressure drop between the first predetermined van't Hoff curve and the second predetermined van't Hoff curve;
   b) extending a length of time cold is available by storing the cold in frozen phase change material; and
   c) controlling a cycle time.

10. The method of claim 8 further comprising selecting the phase change material with a phase change temperature that corresponds to a lowest temperature of operation of a cold space.

11. The method of claim 3 further comprising the step of externally heating the regenerator hydride.

12. The method of claim 12 wherein the step of externally heating the regenerator hydride comprises utilizing a heat source selected from the group consisting of hydrocarbon, solar and electric.

13. The method of claim 3 further comprising the step of controllably transferring hydrogen gas between the refrigerant hydride and the regenerator hydride.

14. The method of claim 3 further comprising the step of removing heat from the regenerator hydride and the refrigerant hydride after hydrogen desorption by the regenerator hydride is complete.

15. A method of heat pump hydride refrigeration comprising the steps of:
   a) providing a refrigerant hydride with a first predetermined van't Hoff curve;
   b) providing a regenerator hydride with a second predetermined van't Hoff curve;
   c) providing the first van't Hoff curve and the second Van't Hoff curve cross at a preselected temperature and pressure;
   d) regenerating the regenerator hydride at a temperature above the crossing of the van't Hoff curves; and e) controlling a lowest temperature of the refrigerant hydride with a phase change material.

16. The method of claim 15 wherein the step of controlling a lowest temperature of the refrigerant hydride with a phase change material comprises:

a) limiting a pressure drop between the first predetermined van't Hoff curve and the second predetermined van't Hoff curve;

b) extending a length of time cold is available by storing the cold in frozen phase change material; and c) controlling a cycle time.

17. The method of claim 15 further comprising selecting the phase change material with a phase change temperature that corresponds to a lowest temperature of operation of a cold space.

* * * * *